US010205953B2

(12) United States Patent
Price et al.

(10) Patent No.: US 10,205,953 B2
(45) Date of Patent: Feb. 12, 2019

(54) OBJECT DETECTION INFORMED ENCODING

(75) Inventors: Douglas Scott Price, San Jose, CA (US); Hsi-Jung Wu, San Jose, CA (US); Xiaosong Zhou, Campbell, CA (US); Dazhong Zhang, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 1132 days.

(21) Appl. No.: 13/359,377

(22) Filed: Jan. 26, 2012

(65) Prior Publication Data

US 2013/0195178 A1   Aug. 1, 2013

(51) Int. Cl.
H04N 19/20   (2014.01)
H04N 19/176   (2014.01)
(Continued)

(52) U.S. Cl.
CPC ........... *H04N 19/20* (2014.11); *H04N 19/115* (2014.11); *H04N 19/124* (2014.11);
(Continued)

(58) Field of Classification Search
CPC ...... H04N 19/17; H04N 19/20; H04N 19/115; H04N 19/124; H04N 19/137;
(Continued)

(56) References Cited

U.S. PATENT DOCUMENTS 5,852,669 A   12/1998 Eleftheriadis et al.
6,173,069 B1   1/2001 Daly et al.
(Continued)

FOREIGN PATENT DOCUMENTS

JP   2007-228614   9/2007
JP   2008-199521   8/2008
(Continued)

OTHER PUBLICATIONS

International Search Report, dated Apr. 25, 2013, from corresponding International Patent Application No. PCT/US2013/023118 filed Jan. 25, 2013.
(Continued)

*Primary Examiner* — Edemio Navas, Jr.
*Assistant Examiner* — William Adrovel
(74) *Attorney, Agent, or Firm* — Baker & Hostetler LLP

(57) ABSTRACT

Embodiments of the present invention provide techniques for coding video data efficiently based on detection of objects within video sequences. A video coder may perform object detection on the frame and when an object is detected, develop statistics of an area of the frame in which the object is located. The video coder may compare pixels adjacent to the object location to the object's statistics and may define an object region to include pixel blocks corresponding to the object's location and pixel blocks corresponding to adjacent pixels having similar statistics as the detected object. The coder may code the video frame according to a block-based compression algorithm wherein pixel blocks of the object region are coded according to coding parameters generating relatively high quality coding and pixel blocks outside the object region are coded according to coding parameters generating relatively lower quality coding.

30 Claims, 5 Drawing Sheets

(51) Int. Cl.
| | |
|---|---|
| *H04N 19/115* | (2014.01) |
| *H04N 19/124* | (2014.01) |
| *H04N 19/137* | (2014.01) |
| *H04N 19/17* | (2014.01) |
| *G06K 9/34* | (2006.01) |
| *G06K 9/00* | (2006.01) |
| *G06K 9/46* | (2006.01) |
| *G06K 9/62* | (2006.01) |
| *G06T 7/10* | (2017.01) |
| *G06T 7/11* | (2017.01) |
| *G06T 7/12* | (2017.01) |
| *G06T 7/13* | (2017.01) |
| *G06T 7/136* | (2017.01) |
| *G06T 7/181* | (2017.01) |
| *G06T 7/143* | (2017.01) |
| *G06T 7/187* | (2017.01) |
| *G06T 7/194* | (2017.01) |

(52) U.S. Cl.
CPC ......... *H04N 19/137* (2014.11); *H04N 19/176* (2014.11); *G06K 9/0061* (2013.01); *G06K 9/00221* (2013.01); *G06K 9/00234* (2013.01); *G06K 9/00248* (2013.01); *G06K 9/342* (2013.01); *G06K 9/4638* (2013.01); *G06K 9/6202* (2013.01); *G06T 7/10* (2017.01); *G06T 7/11* (2017.01); *G06T 7/12* (2017.01); *G06T 7/13* (2017.01); *G06T 7/136* (2017.01); *G06T 7/143* (2017.01); *G06T 7/181* (2017.01); *G06T 7/187* (2017.01); *G06T 7/194* (2017.01); *G06T 2207/20012* (2013.01); *G06T 2207/20016* (2013.01); *G06T 2207/20116* (2013.01); *G06T 2207/20121* (2013.01); *G06T 2207/20124* (2013.01); *G06T 2207/20128* (2013.01); *G06T 2207/20132* (2013.01); *G06T 2207/20152* (2013.01); *G06T 2207/20156* (2013.01); *G06T 2207/20161* (2013.01); *G06T 2207/20164* (2013.01); *G06T 2207/20168* (2013.01); *G06T 2207/30201* (2013.01); *H04N 19/17* (2014.11)

(58) Field of Classification Search
CPC ............. H04N 19/176; H04N 19/0006; H04N 19/0009; H04N 19/00145; H04N 19/00278; H04N 19/00387; H04N 19/00254; H04N 7/26276; G06K 9/342; G06K 9/00221; G06K 9/00234; G06K 9/00248; G06K 9/4638; G06K 9/6202; G06K 9/0061; G06T 7/10; G06T 7/11; G06T 7/12; G06T 7/13; G06T 7/136; G06T 7/181; G06T 7/143; G06T 7/187; G06T 7/194; G06T 2207/20012; G06T 2207/20016; G06T 2207/30201; G06T 2207/20116; G06T 2207/20121; G06T 2207/20124; G06T 2207/20128; G06T 2207/20132; G06T 2207/20152; G06T 2207/20156; G06T 2207/20161; G06T 2207/20164; G06T 2207/20168
See application file for complete search history.

(56) References Cited

U.S. PATENT DOCUMENTS

| | | | |
|---|---|---|---|
| 6,453,069 B1* | 9/2002 | Matsugu | G06K 9/48 382/173 |
| 6,594,375 B1 | 7/2003 | Kato et al. | |
| 6,987,889 B1 | 1/2006 | Horowitz | |
| 7,031,517 B1* | 4/2006 | Le | G06K 9/342 375/E7.13 |
| 7,269,292 B2 | 9/2007 | Steinberg | |
| 7,310,435 B2* | 12/2007 | Mallya | A61B 6/00 378/23 |
| 7,620,218 B2* | 11/2009 | Steinberg | G06K 9/00228 382/103 |
| 8,520,892 B2* | 8/2013 | Kuleschow | G06T 7/136 382/103 |
| 8,655,102 B2* | 2/2014 | Smith | G06K 9/346 358/3.26 |
| 2001/0016066 A1* | 8/2001 | Amonou | G06T 7/11 382/173 |
| 2002/0164074 A1* | 11/2002 | Matsugu | G06K 9/48 382/173 |
| 2002/0172426 A1* | 11/2002 | Honda et al. | 382/235 |
| 2003/0099386 A1* | 5/2003 | Schneider | G06K 9/342 382/130 |
| 2003/0128882 A1 | 7/2003 | Kim et al. | |
| 2004/0130546 A1* | 7/2004 | Porikli | G06K 9/342 345/423 |
| 2005/0058345 A1* | 3/2005 | Koide | G06K 9/00986 382/173 |
| 2006/0204113 A1 | 9/2006 | Wang et al. | |
| 2007/0154096 A1* | 7/2007 | Cao | G06K 9/00234 382/190 |
| 2007/0248164 A1* | 10/2007 | Zuo et al. | 375/240.2 |
| 2008/0152245 A1* | 6/2008 | El-Maleh | H04N 21/4621 382/254 |
| 2008/0267498 A1* | 10/2008 | Shaw | G06K 9/342 382/173 |
| 2009/0010328 A1* | 1/2009 | Pan | H04N 19/115 375/240.08 |
| 2009/0202169 A1* | 8/2009 | Hayashi | 382/264 |
| 2009/0310822 A1* | 12/2009 | Chang | G06T 7/11 382/103 |
| 2009/0324113 A1* | 12/2009 | Lu et al. | 382/234 |
| 2010/0124274 A1 | 5/2010 | Cheok et al. | |
| 2012/0114231 A1* | 5/2012 | Bushell | G06T 7/0081 382/165 |
| 2012/0281904 A1* | 11/2012 | Gong | G06K 9/6206 382/131 |
| 2014/0118578 A1* | 5/2014 | Sasaki | G06T 5/20 348/241 |

FOREIGN PATENT DOCUMENTS

| | | |
|---|---|---|
| JP | 2009-005238 A | 1/2009 |
| KR | 10-2002-0077093 A | 10/2002 |
| KR | 10-2010-0002632 A | 1/2010 |
| KR | 10-2010-0095833 A | 9/2010 |

OTHER PUBLICATIONS

Moschetti et al., "Automatic Object Extraction and Dynamic Bitrate Allocation for Second Generation Video Coding," Proceedings of IEEE International Conference in Lausanne, Switzerland, Aug. 26-29, 2002, IEEE, vol. 1, Aug. 26, 2002.

Meguro et al., "Object Extraction from Image Sequence Based on Correction of Segmented Regions in Each of the Consecutive Frames", IMPS 2001, The Proceeding of the 6th Image Media Processing Symposium, The Institute of Electronics Information and Communication Engineers, Institute of Technical Committee on Image Engineering, pp. 21-22, Nov. 14, 2001 (English language abstract provided on p. 9 of the attached non-patent literature).

* cited by examiner

100

200

300

(a)

(b)

(c)

400

600

500

700

OBJECT DETECTION INFORMED ENCODING

BACKGROUND

The present invention relates to video coding and, in particular, to video coding techniques that conserve bandwidth while at the same time preserving image quality.

Video coding/decoding systems are being deployed in an ever-increasing variety of consumer devices. Video codecs may be found in modern smartphones and tablet computers, for instance, where communication bandwidth is furnished by wireless networks or other infrastructures providing relatively low and unpredictable bandwidth. Such applications are markedly different than other codec applications, such as, for example, DVD players, where much larger bandwidth may be available for coded video data. Accordingly, modern applications of such codecs impose higher performance requirements on codec designers to reduce the bitrate of coded video as much as possible while still providing good image quality.

The inventors perceive a need in the art for a video coder that identifies objects of interest within video frames and selects coding parameters to provide high quality coding of regions that include the objects, to conserve bandwidth at other regions of the frames, and to provide smooth coding transitions between the various regions.

DETAILED DESCRIPTION

Figure 1:
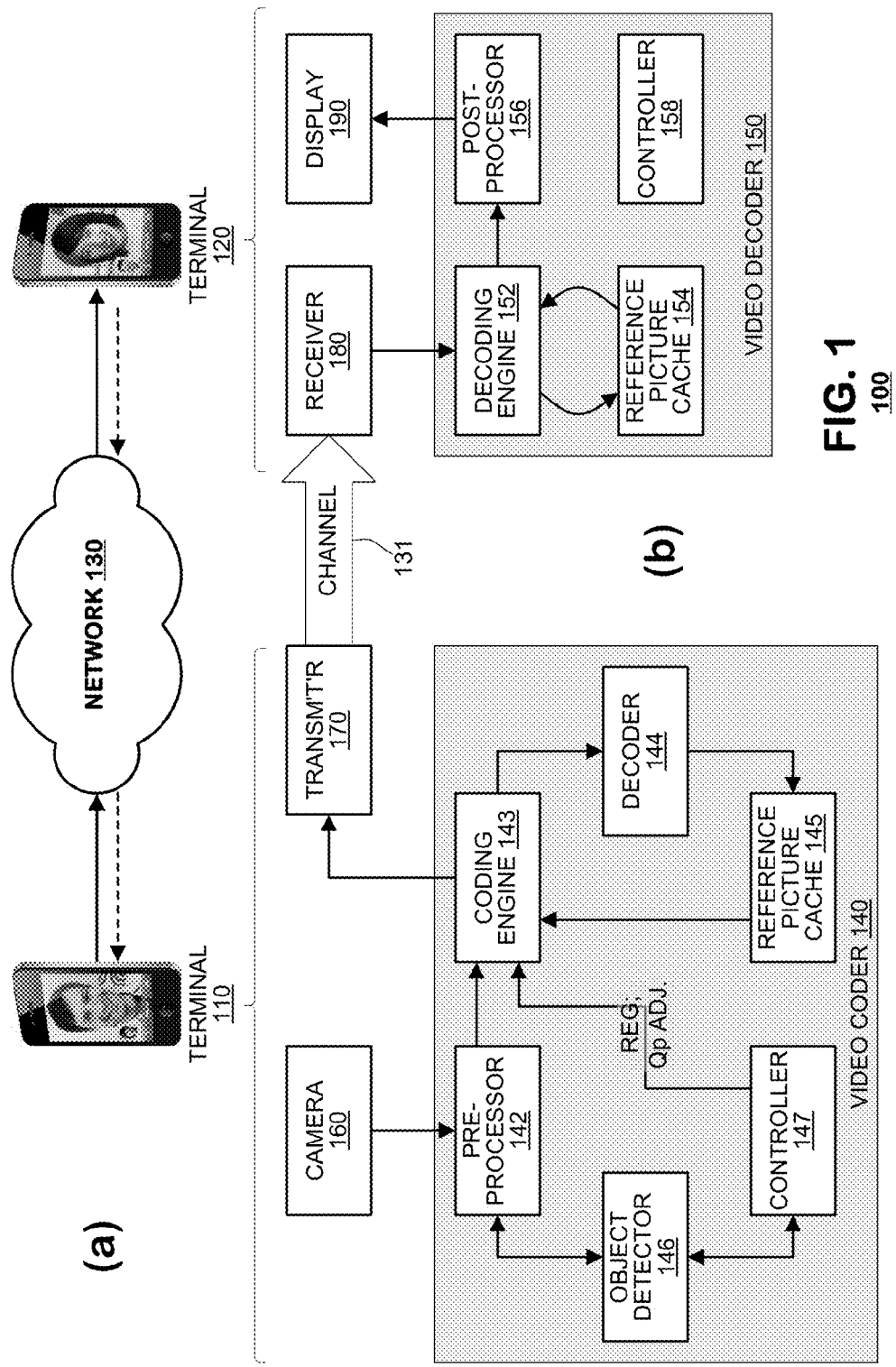
FIG. 1 illustrates a simplified block diagram of a video coding system according to an embodiment of the present invention.

Embodiments of the present invention provide techniques for coding video data efficiently based on detection of objects within video sequences. According to the embodiments, a video coder may perform object detection on the frame and when an object is detected, develop statistics of an area of the frame in which the object is located. The video coder may compare pixels adjacent to the object location to the object's statistics and may define an object region to include pixel blocks corresponding to the object's location and pixel blocks corresponding to adjacent pixels having similar statistics as the detected object. The coder may code the video frame according to a block-based compression algorithm wherein pixel blocks of the object region are coded according to coding parameters generating relatively high quality coding, and pixel blocks outside the object region are coded according to coding parameters generating relatively lower quality coding.

Other embodiments provide more sophisticated coding techniques. For example, a video coder may distinguish, from within individual pixel blocks, portion of the pixel block that are part of the detected object from other portions of the pixel block that are not part of the detected object. These embodiments further may apply pre-processing operations to the different portions of pixel blocks to preserve high quality coding of the portion belonging to the detected object and to provide high compression coding to non-object portions. For example, a coder may apply a blurring filter to non-object portions of a pixel block prior to coding.

FIG. 1(a) illustrates a simplified block diagram of a video coding system 100 according to an embodiment of the present invention. The system 100 may include a plurality of terminals 110, 120 interconnected via a network 130. The terminals 110, 120 each may capture video data at a local location and code the video data for transmission to the other terminal via the network 130. Each terminal 110, 120 may receive the coded video data of the other terminal from the network 130, decode the coded data and display the recovered video data.

In FIG. 1(a), the terminals 110, 120 are illustrated as smart phones but the principles of the present invention are not so limited. Embodiments of the present invention find application with personal computers (both desktop and laptop computers), tablet computers, computer servers, media players and/or dedicated video conferencing equipment. The network 130 represents any number of networks that convey coded video data between the terminals 110, 120, including for example wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless explained hereinbelow.

FIG. 1(b) further illustrates a functional block diagram of a video coder and decoder 140, 150 operable within the system 100. The terminal 110 may include a camera 160, the video coder 140 and a transmitter 170. The video coder 140 may code video data captured at the camera 160 and may deliver the coded data to a channel 131 provided by the network 130. The video coder 140 may select coding parameters based on the content of the video data. The transmitter 170 may merge coded video data provided by the video coder 140 with other data stream(s) provided by audio codecs or other data sources (not shown) and may condition the data for transmission to the other terminal 120.

The second terminal 120 may include a receiver 180, video decoder 150 and display 190. The receiver 180 may receive data from the channel 131 and parse the channel data into various data stream(s), including a stream of coded video. The video decoder 150 may decode the coded video data, inverting coding processes performed by the video coder 140, to recover video data therefrom. The video data may be rendered by the display 190 or may be stored for later use.

As illustrated, the video coder 140 may include a pre-processor 142, a coding engine 143, a local decoder 144, a reference picture cache 145, an object detector 146 and a controller 147. The pre-processor 142 may accept source video from the camera 160 and may perform various processing operations on the source video to condition it for coding. The coding engine 143 may perform compression operations on the pre-processed video to reduce spatial and/or temporal redundancies therein. The coding engine 143 may output coded video data to the transmitter 170. The decoder 144 may decode coded video data of reference frames and may store the decoded reference frame in the reference picture cache 145 for use in coding later-received video.

As its name implies, the object detector 146 may identify objects within the source video, for example, human faces or other predetermined types of objects. The object detector 146 may generate data to the controller 147 indicating whether objects are detected within the frames and, if so, where the objects were found. In response, the controller 147 may define one or more coding regions within the frame and may provide coding adjustments to the coding engine 143 for each of the coding regions.

The pre-processor 142 may perform a variety of video processing operations on the source video output from the camera to condition the source video for coding. The pre-processor 142 may include an array of filters (not shown) such as de-noising filters, sharpening filters, smoothing filters, bilateral filters and the like, that may be applied dynamically to the source video based on characteristics observed within the video. The pre-processor 142 may include its own controller (not shown) to review the source video data from the camera and select one or more of the filters for application. Typically, the pre-processor 142 conditions the source video data to render compression more efficient or to preserve image quality in light of data losses that may be incurred as the coding engine 143 operates.

The coding engine 143 may code input video data according to a variety of different coding techniques to achieve compression. The coding engine 143 may compress the images by a motion-compensated prediction. Frames of the input video may be assigned a coding type, such as intra-coding (I-coding), uni-directionally predictive coding (P-coding) or bi-directionally predictive coding (B-coding). The frames further may be parsed into a plurality of pixel blocks and may be coded by transform coding, quantization and entropy coding. The coding engine 143 may select quantization parameters in cooperation with the controller 147, which truncate low-energy transform coefficients. Pixel blocks of P- and B-coded frames may be coded predictively, in which case, the coding engine may calculate motion vectors identifying pixel blocks of decoded frames stored in the reference picture cache 145 that serve as predictions of the pixel blocks being coded and may generate prediction residuals prior to engaging the transform coding. In an embodiment, the video coder may operate according to coding protocols defined by ITU H.263, H.264 and the like.

The coding engine 143 further may designate that certain coded frames may be used as reference frames for use in coding later-received input frames. The decoder 144 may decode coded video data of the reference frames and store the video data recovered therefrom in the reference picture cache 145. In this manner, the video coder 140 has a decoded copy of the reference frame as it will be decoded at the video decoder 150.

As noted, the object detector 146 may detect the presence of predetermined types of objects in source video frames. Typically, the object detector 146 may output data representing pixel coordinates of the detected object within the source video frames. The controller 147 may correlate the coordinates of the detected object to pixel blocks of the source frame and may define a predetermined number of coding regions therefrom. The controller 147 may provide coding parameters for the coding engine 143 to use when coding the pixel blocks of the frame. Generally speaking, coding parameters may be set to provide high quality coding of pixel blocks in regions closest to the detected object(s) and to provide relatively lower quality coding of pixel blocks farther removed from the detected objects.

The transmitter 170 may transmit the coded video data to the channel 131. In so doing, the transmitter 170 may multiplex the coded video data with other data to be transmitted such as coded audio data and control data (provided by processing sources that are not illustrated in FIG. 1). The transmitter 170 may perform channel coding operations such as error correction coding, interleaving, packetization and the like, and may modulate and transmit the data to the network 130.

The video decoder 150 may include a decoding engine 152, a reference picture cache 154, a post-processor 156 and a controller 158. The decoding engine 152 may decode coded video data received via the channel 131 with reference to reference pictures stored in the reference picture cache 154. The decoding engine 152 may output decoded video data to the post-processor 156, which may perform additional operations on the decoded video data to condition it for display. Decoded video data of reference frames also may be stored to the reference picture cache 154 for use during decoding of subsequently received coded video data.

The decoding engine 152 may perform decoding operations that invert coding operations performed by the coding engine 143. The decoding engine 152 may perform entropy decoding, dequantization and transform decoding to generate recovered pixel block data. Quantization/dequantization operations are lossy processes and, therefore, the recovered pixel block data likely will be a replica of the source pixel blocks that were coded by the video coder 140 but will include some error. For pixel blocks coded predictively, the transform decoding may generate residual data; the decoding engine 152 may use motion vectors associated with the pixel blocks (which may be implied in some cases) to retrieve predicted pixel blocks from the reference picture cache 154 to be combined with the prediction residuals. Decoded pixel blocks may be reassembled into frames and output to the post-processor 156.

When the decoding engine 152 decodes new reference frames, it may store the decoded reference frames in the reference picture cache 154 for use in decoding subsequently-received coded video data.

The post-processor 156 may perform additional video processing to condition the recovered video data for rendering, commonly at a display device. Typical post-processing operations may include applying deblocking filters, edge detection filters, ringing filters and the like. The post-processor 156 may output recovered video sequence from rendering on the display 190 or, optionally, stored to memory for later retrieval and display.

The functional blocks illustrated in FIG. 1(b) support video coding and decoding in one direction only. For bidirectional communication, terminal 120 may include functional blocks (not shown) for video coding of locally-captured video and terminal 110 may include functional blocks (also not shown) for decoding of coded video data received from the terminal 120 via the network 130. Although it is envisioned that the principles of the present invention may be applied at coders resident at either terminal 110, 120, the functional blocks provided for the terminal 120 to terminal 110 coding direction are omitted from FIG. 1 merely to simplify the present discussion.

Figure 2:
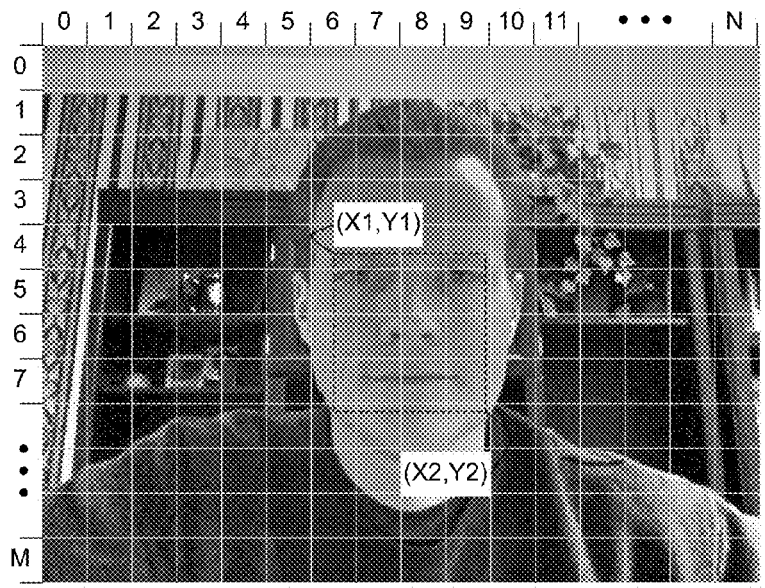
FIG. 2 illustrates an exemplary frame of video data that may be processed by a video coder, according to an embodiment of the present invention.

FIG. 2 illustrates an exemplary frame of video data that may be processed by a video coder, according to an embodiment of the present invention. FIG. 2 illustrates the frame 200 having been parsed into an array of pixel blocks. Each pixel block may contain a predetermined number of pixels, typically a square (e.g., 8×8 pixels or 16×16 pixels) or a rectangular array (e.g., 4×8 pixels, 4×16 pixels, 16×8 pixels, etc.) of pixels. The frame, therefore, may contain an array of pixel blocks. An exemplary array of N×M pixel blocks is illustrated in FIG. 2.

FIG. 2 also illustrates operation of exemplary object detection as applied to the frame 200. In this example, the object detection is face detection. A face detection algorithm may identify the presence of a human face within the image data and generate a pair of coordinates (X1, Y1), (X2, Y2) identifying a location within the frame 200 in which the face is detected. The coordinates may define, for example, opposing corners of a rectangle representing the face.

Figure 3:
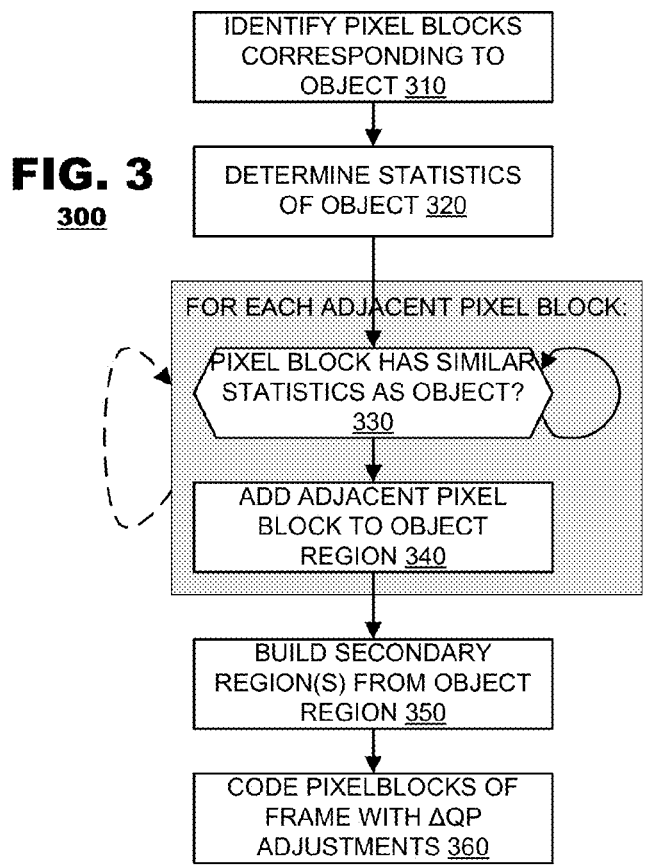
FIG. 3 illustrates a method of coding pixel blocks of a frame of video data, according to an embodiment of the present invention.

FIG. 3 illustrates a method 300 of coding pixel blocks of a frame of video data, according to an embodiment of the present invention. The method 300 may begin using coordinate data representing location of a detected object. The method 300 may identify pixel blocks of the frame that correspond to the location of the detected object (box 310). The method 300 may sample data of pixels within the object location to determine statistics of the object (box 320). Relevant statistics may include color, luma/brightness, spatial complexity and variance of pixel values within a pixel block and relative variance of pixel values between pixel blocks. Thereafter, the method 300 may search among pixel blocks adjacent to the detected object for similar statistics as those found within the pixel blocks of the detected object. For each adjacent pixel block, the method 300 may determine whether the adjacent pixel block has statistics similar to those of the object and, if so, the method may add the adjacent pixel block to the object region (boxes 330-340). The object may iterate through all pixel blocks adjacent to the detected object until all neighboring pixel blocks with similar statistics have been added to the object region.

Once the object region is defined, the method 300 may build a plurality of sub-regions extending away from the object region a predetermined distance (box 350). Thereafter, the method 300 may code pixel blocks of the frame according to motion compensation prediction. Coding parameters of the object region and each sub-region may be selected to emphasize high coding quality within the object region and increasingly lower levels of coding quality in the sub-regions at successively higher distances from the object region (box 360).

As described above, the decision of whether to include a pixel block into the object region (box 330) may be performed based on a comparison of statistics of the pixel blocks already included in the object region to a candidate pixel block that is adjacent to one of the pixel blocks in the object region. In an embodiment, the comparison may involve a similarity threshold—if the difference between the statistics of the candidate pixel block and the object region's pixel block are less than the similarity threshold, the candidate pixel block may be admitted to the object region (box 340). Iterative operation may cause the object region to expand in different directions according to observed statistics. In some circumstances, a given pixel block may fail to be admitted to an object region but may be surrounded, either partially or entirely, by pixel blocks that are admitted to the object region. In an embodiment, the method 300 may revise the similarity thresholds for pixel blocks that are adjacent to a multiple pixel blocks of the object region or, alternatively, are entirely surrounded by pixel blocks of the object region. In such circumstances, the thresholds may be lowered. In practical application, image content of a pixel block tends to belong to an object when it is surrounded on all sides by pixel blocks that also belong to the detected object. Lowering the similarity thresholds of such pixel blocks may facilitate admission of the surrounded pixel block to the object region, particularly when statistics of the surrounded pixel block are generally consistent with those of the object region but not so close as to pass under a default similarity threshold.

Figure 4:
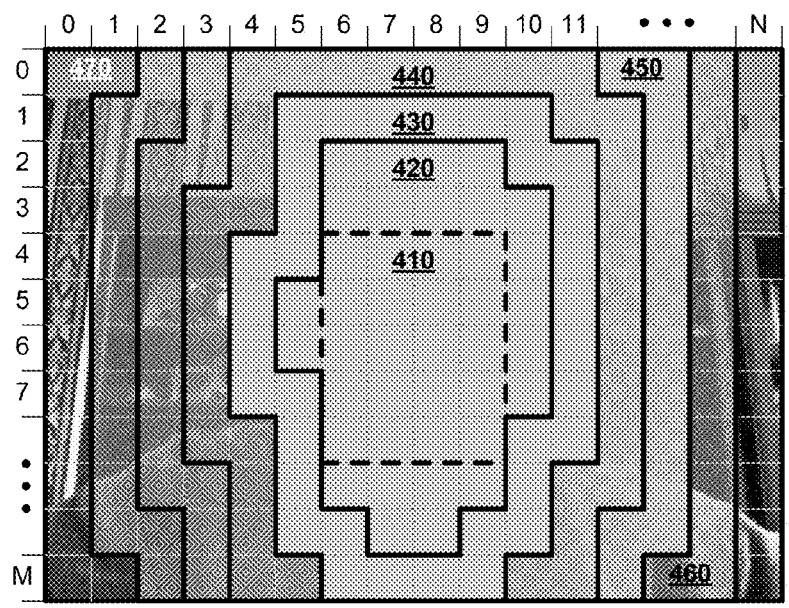
FIGS. 4-6 illustrate examples of various embodiments of the present invention as applied to the frame data illustrated in FIG. 2.
Figure 4:
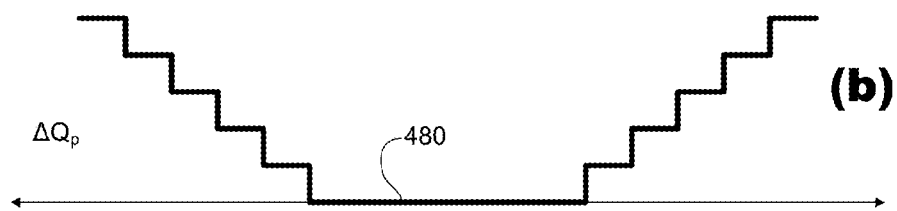
Figure 4:
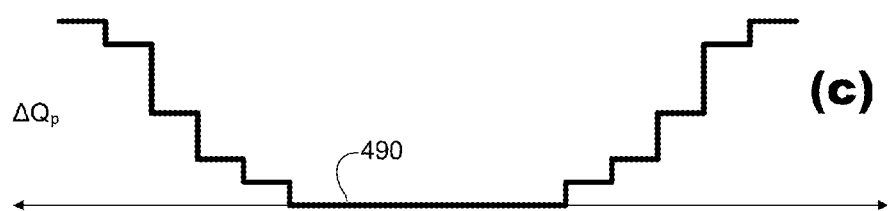

FIG. 4 illustrates application of the method of FIG. 3 to the exemplary frame of FIG. 2. In FIG. 4(a), pixel blocks shown in region 410 are assigned to the object region because those pixel blocks cover the rectangle output by object recognition in FIG. 3, box 310. Thereafter, as the method 300 searches for adjacent pixel blocks that have statistics similar to the pixel blocks within region 410, the method 300 may include those pixel blocks in region 420. For coding purposes, region 420 may be considered the object region.

Once the object region is identified, the method may define other regions 430-470 to surround the object region. In the example of FIG. 4(a), each successive region may be defined to include pixel blocks that are adjacent to a prior region in any direction. Thus, region 430 includes all pixel blocks that are adjacent to region 420 in any direction and region 440 includes all pixel block adjacent to region 430. This process may continue until all pixel blocks of the frame are assigned to a region. In this example, each region effectively represents a "halo" that surrounds a preceding region.

Having assigned the pixel blocks to regions, the method 300 (FIG. 3) may assign coding parameter adjustments to the regions. In the embodiment illustrated in FIG. 4, quantization parameter adjustments ($\Delta Q_p$) may be applied to pixel blocks of each region. As discussed, quantization parameters truncate transform coefficients obtained during pixel block coding and, for low-energy coefficients, can delete them entirely. Quantization can induce data loss because truncated data may not be recovered fully during dequantization at a decoder. Thus, recovered video obtained at a decoder is likely to be a replica of source video but may have noticeable image artifacts as a result of coding.

According to an embodiment of the present invention, quantization parameter adjustments may be assigned to the various regions of a frame to provide lower quantization parameters at the object regions and increasingly high quantization parameters at regions remote from the object region. FIG. 4(b) illustrates exemplary quantization parameter adjustments that may be assigned to the pixel blocks shown in row 5 of FIG. 4(a). As illustrated in FIG. 4(b), the quantization parameter adjustments may vary from a maximum value at pixel block locations corresponding to region 470 through intermediate values for regions 460-430 to a minimum value at pixel block locations corresponding to region 420. Although FIG. 4(b) illustrates uniform step sizes in quantization parameter adjustments, FIG. 4(c) illustrates another embodiment in which quantization parameter adjustments vary in a non-uniform manner.

Figure 5:
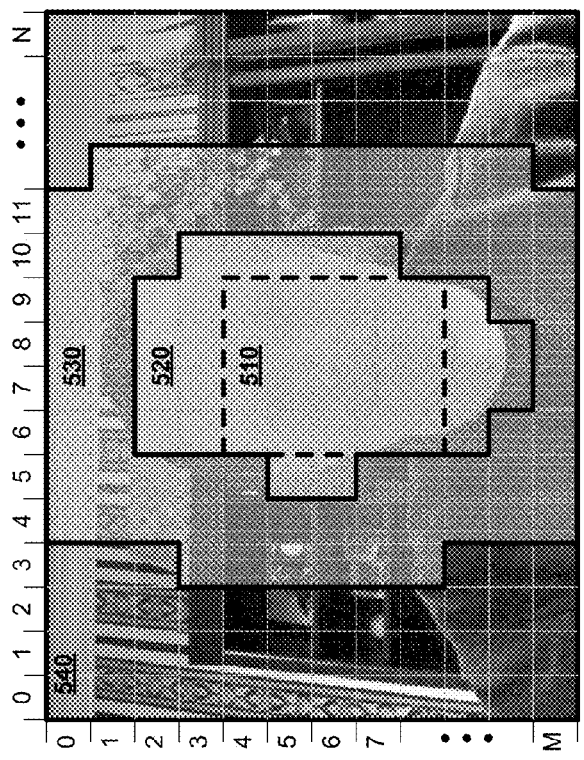
Figure 5:

Embodiments of the present invention accommodate variation in the manner in which coding regions are defined. FIG. 5 illustrates an embodiment in which only two sub-regions 530, 540 are defined to surround the object region 520. In this embodiment, a first sub-region 530 surrounds the object region 520 and all other pixel blocks of the frame are assigned to a background region 540. Sub-region 530 in this example extends from region 520 a distance of two pixel blocks in every direction. Quantization parameter adjustments may be set to a minimum level for the object region 520, an intermediate level for sub-region 530 and to a maximum level for the background sub-region 540.

Figure 6:
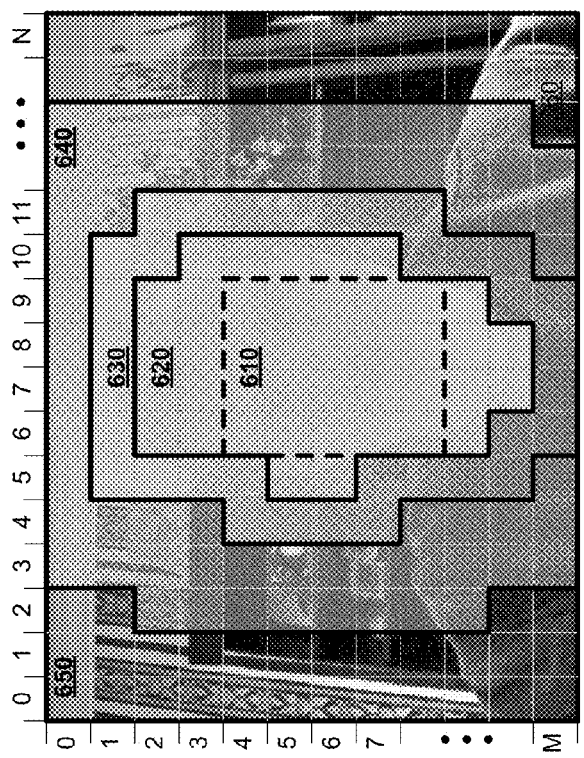
Figure 6:

In the embodiment of FIG. 6, the area consumed by each sub-region may vary. For example, sub-region 630 extends a distance of a single pixel block in every direction from object region 620 but sub-region 640 extends a distance of two pixel blocks in every direction from sub-region 630.

The method of FIG. 3 is effective in many real time coding environments, such as video coding systems and the like, to estimate locations of desired objects accurately. In many such applications, there is a latency between the output of the object detector 146 (FIG. 1) and the frames being coded by the coding engine 143. In other words, the coding engine 143 may be coding a frame X using location data from frame X-Off. The method of FIG. 3 reduces visible artifacts that may otherwise appear by fine tuning the position of the object rectangle identified by the object detector 146. Such artifacts would be particularly troubling in the context of face detection systems if portions of a face were coded with high quality but other portions of the same face were coded with low quality.

In other embodiments of the invention, pre-processing operations may vary across different spatial areas of a frame according to their distance from the detected object. For example, a pre-processor 142 (FIG. 1) may apply a blur filter to the frame, to decrease sharpness at areas remote from the screen. In this embodiment, the pre-processor 142 may vary the strength of the blur filter based on distance from the detected object. Doing so may reduce quality of background elements of the frame, those elements that are not present within the region of the detected objects, but may increase compression efficiency because higher frequency components of the background elements likely will be reduced.

In another embodiment, the pre-processor 142 may vary the strength of a blur filter based on estimated motion of the frame. Motion may be estimated by the pre-processor 142 from analysis of the video sequence or, alternatively, may be estimated from motion sensors (not shown) provided within the terminal 110. The strength of the blur filter may be increased as estimated motion increases.

Figure 7:
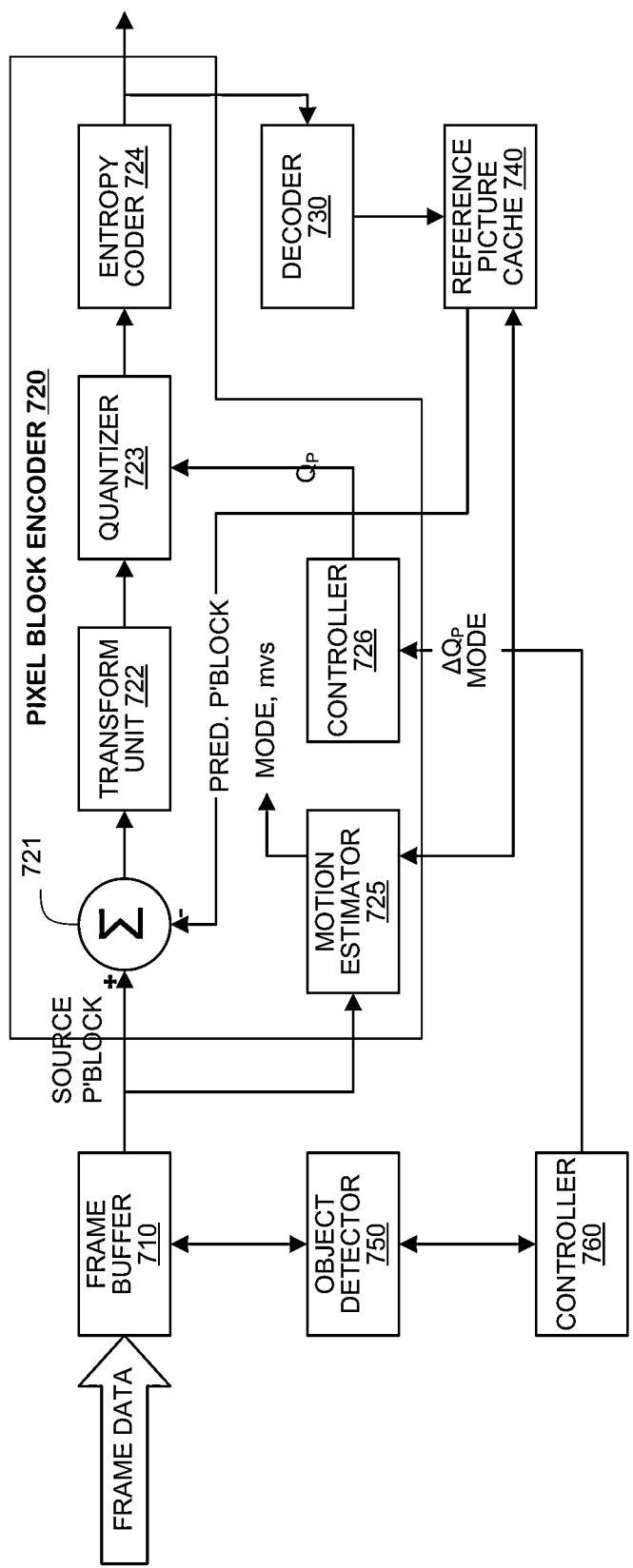
FIG. 7 illustrates a simplified block diagram of a pixel block coding system according to an embodiment of the present invention.

FIG. 7 illustrates a video coder 700 according to another embodiment of the present invention. Here, the video coder is illustrated as including a frame buffer 710, pixel block encoder 720, decoder 730, reference picture cache 740, object detector 750 and controller 760. The frame buffer 710 may store frames of source video and may furnish pixel blocks therefrom to the pixel block encoder 720. The pixel block encoder 720 may code the pixel blocks according to motion compensated coding techniques, discussed below. Coded pixel block data output from the pixel block encoder 720 may be stored in an output buffer (not shown) until it is ready to be transmitted. The decoder 730 may decode coded video data of reference frames and store video data recovered thereby in the reference picture cache 740. The object detector 750 and controller 760 may cooperate to recognize objects within each frame of video and define object region(s) and sub-regions therefrom.

As noted, the pixel block encoder 720 may code pixel blocks according to motion compensated prediction techniques in which an input pixel block may be coded on an intra basis (I-block) or inter basis (P- or B-blocks). Further, a given pixel block may be coded as a SKIP block in which content of the pixel block is not coded at all but rather copied from a co-located pixel block of some previously coded/decoded frame.

The pixel block encoder 720 may include a subtractor 721, a transform unit 722, a quantizer 723, an entropy coder 724, a motion estimator 725 and a controller 726. Given an input pixel block, the motion estimator 725 may perform a search among cached reference picture frames for a pixel block to serve as a prediction reference for the input pixel block. If appropriate match(es) are found, the pixel block encoder 720 may code the source pixel block as a P- or B-block. If no appropriate match is found, the pixel block encoder 720 may code the source pixel block as an I-block. The pixel block encoder 720 also may code the pixel block in SKIP mode in appropriate circumstances. Once a coding mode is selected, the motion estimator 725 (or controller 726 in appropriate circumstances) may generate metadata representing a coding mode applied to the source pixel block. In many cases, for inter-coded blocks, the motion estimator 725 may generate motion vectors identifying the reference pixel block that was selected.

To code an input pixel block predictively, the reference picture cache 740 may output the predicted pixel block data to the subtractor 721. The subtractor 721 may generate data representing a difference between the source pixel block and predicted pixel block. The subtractor 721 may operate on a pixel-by-pixel basis, developing residuals at each pixel position over the pixel block. If a given pixel block is to be coded non-predictively, then a predicted pixel block will not be provided to the subtractor 721; the subtractor 721 may output pixel residuals that are the same as the source pixel data.

The transform unit 722 may convert the pixel block data output by the subtractor 721 into an array of transform coefficients, such as by a discrete cosine transform (DCT) process or a wavelet transform. Typically, the number of transform coefficients generated therefrom will be the same as the number of pixels provided to the transform unit 722. Thus, an 8×8, 8×16 or 16×16 block of pixel data may be transformed to 8×8, 8×16 or 16×16 blocks of coefficient data. The quantizer unit 723 may quantize (divide) each transform coefficient of block by a quantization parameter Qp. The entropy coder 724 may code the quantized coefficient data by run-value coding, run-length coding or the like. Data from the entropy coder 724 may be output to the channel as coded video data of the pixel block.

The pixel block encoder's controller 726 may select coding modes for pixel blocks according to coding policies that represent a balance among expected bitrate of coded video data, expected coding quality, and robustness against coding errors. Thus, even when appropriate prediction matches may be found for a given source pixel block, the controller 726 may impose a mode selection that codes the pixel block as an I-block. Although I-blocks generally consume higher bit rates than P- or B-blocks, I-blocks can mitigate against transmission errors and the like. Similarly, the controller 726 may select quantization parameters for pixel blocks to meet bit rate targets.

According to an embodiment of the present invention, the controller 760 may provide coding parameter adjustments to the pixel block encoder's controller 726, which may influence selection of coding parameters for given source pixel blocks. Thus, when the pixel block encoder 720 is operating on a pixel block belonging to the object region (say region 420 of FIG. 4(a)), the controller 760 may cause the pixel block encoder 720 to use a relatively low quantization parameter for the frame and, when the pixel block encoder 720 is operating on a pixel block belonging to a sub-region (regions 430-470 of FIG. 4(a)), the controller 760 may cause the pixel block encoder 720 to use quantization parameters appropriate for those regions.

In another embodiment, the controller 760 may impose coding modes on certain ones of the sub-regions. Using FIG. 5 as an example, the controller 760 may cause the pixel block encoder 720 to code pixel blocks of region 540 in SKIP mode and impose quantization parameter adjustments to regions 520 (lowest Qp) and 530 (higher Qp) respectively.

In further embodiments, coding parameters also may be selected based on other observed characteristics of the detected object. For example, when face detection is used, a face detector may detect whether a face exhibits specific characteristics (e.g., whether the face is blinking or smiling, how much the face is rotated, the size of the face as a percentage of the scene). The encoder may select coding parameters based on these features. By way of example, a rotated face might be assigned a lower priority than a face looking straight ahead and therefore, relatively lower quality coding parameters. Also, an object detector may indicate a number of objects identified in the video sequence (e.g., a number of faces). In a scene with only two faces, for example, the encoder may assign the faces a higher priority than faces in a scene with fifty faces. Again, higher priority assignments may lead to selection of coding parameters that generate relatively higher quality coding.

In other embodiments, specific sub-regions of an object can be assigned different quality coding levels. For example, the eyes and mouth of a detected face may be detected by a face detector and given higher encoding priority than other detected elements of the face. In this embodiment, the system may generate a pair of object regions—a first object region corresponding to high priority elements of a detected object (e.g., a region occupied by the eyes and mouth) a second object region corresponding to other elements of the detected object (e.g., the remainder of the face) and sub-regions occupying the remainder of the frame.

The foregoing discussion has described operation of the embodiments of the present invention in the context of coders and decoders. Commonly, video coders are provided as electronic devices. They can be embodied in integrated circuits, such as application specific integrated circuits, field programmable gate arrays and/or digital signal processors. Alternatively, they can be embodied in computer programs that execute on personal computers, notebook or tablet computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronic devices, such as gaming systems, smartphones, DVD players, portable media players and the like, and they also can be packaged in consumer software applications such as video games, browser-based media players and the like.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method, comprising:
    parsing a frame to be coded into a plurality of pixel blocks,
    performing object detection on the plurality of pixel blocks, and
    when an object is detected, defining a final object region by:
        defining an initial object region representing an area of the frame in which the object is located and sampling the pixel blocks in the initial object region to develop statistics of the detected object,
        comparing statistics of pixel blocks not in the initial object region but adjacent to the initial object region to the object statistics of the detected object based on a variable similarity threshold,
        for pixel blocks adjacent to at least two pixel blocks of the initial object region, lowering the variable similarity threshold for the comparison to increase a probability of admission of the at least two pixel blocks into final object region,
        growing the final object region to include: (1) the pixel blocks of the initial object region, and (2) when the lowered variable similarity thershold is met, the pixel blocks adjacent to the at least two pixel blocks of the initial object region identified by the comparison as having similar statistics to the detected object statistics,
    reducing a quality of coding parameters of the pixel blocks outside the final object region according to each pixel block's respective distance from the final object region;
    defining a plurality of sub-regions of the frame outside the object region;
    assigning each pixel block outside the object region to a respective sub-region according to that pixel block's quality of coding parameters; and
    coding the frame according to a block-based compression algorithm wherein pixel blocks of the final object region are coded according to coding parameters generating relatively high quality coding and pixel blocks of each of the sub-regions are coded according to the quality of coding parameters of the pixel blocks within each sub-region.

2. The method of claim 1, wherein the coding parameters include quantization parameters and the quantization parameters of the object region pixel blocks are generally lower than the quantization parameters of the non-object region pixel blocks.

3. The method of claim 1, wherein the coding parameters include coding mode selections and coding mode selections of non-object region pixel blocks are set to SKIP.

4. The method of claim 1, further comprising, prior to coding, applying a blurring filter to pixels in spatial areas outside the final object region.

5. The method of claim 1, wherein the quality reduction is a quantization parameter adjustment.

6. The method of claim 1, wherein the sub-regions form halos of pixel blocks around the object region.

7. The method of claim 1, wherein the object detection is face detection.

8. The method of claim 7, further comprising detecting whether the face exhibits a predetermined expression.

9. The method of claim 1, further comprising adding to the final object region pixel blocks surrounded by pixel blocks in the object region.

10. The method of claim 1, further comprising applying a blur filter to a pixel block and varying a strength of the blur filter according to an amount of estimated motion associated with the pixel block.

11. A video coding method, comprising:
    parsing a frame to be coded into a plurality of pixel blocks,
    performing object detection on the plurality of pixel blocks, and when an object is detected, defining a final object region by:
defining an initial object region representing an area of the frame in which the object is located and sampling the pixel blocks in the initial object region to develop statistics of the initial object region,
comparing statistics of pixel blocks not in the initial object region but adjacent to the initial object region to the object statistics of the detected object based on a variable similarity threshold,
for pixel blocks adjacent to at least two pixel blocks of the initial object region, lowering the variable similarity threshold for the comparison to increase a probability of admission of the at least two pixel blocks into the final object region,
growing the final object region to include (1) the pixel blocks of the initial object region, and (2) when the lowered variable similarity threshold is met, the pixel blocks adjacent to the at least two pixel blocks of the initial object region identified by the comparison as having similar statistics to the detected object statistics,
increasing quantization parameters of the pixel blocks outside the final object region according to each pixel block's respective distance from the final object region,
defining a plurality of sub-regions of the frame outside the object region,
assigning each pixel block outside the final object region to a respective sub-region according to that pixel block's quantization parameters, and
coding the frame according to a block-based compression algorithm wherein pixel blocks of the final object region are coded according to relatively lower quantization parameters and pixel blocks of each of the sub-regions outside the final object region are coded according to generally higher quantization parameters of the pixel block's within each sub-region.

12. The method of claim 11, wherein the increasing of quantization parameters varies linearly based on a distance of each sub-region's distance from the object region.

13. The method of claim 11, wherein the increasing of quantization parameters varies non-uniformly based on a distance of each sub-region's distance from the object region.

14. The method of claim 11, wherein the sub-regions form halos of pixel blocks around the object region.

15. The method of claim 11, further comprising, prior to coding, applying a blurring filter to pixels in spatial areas outside the final object region.

16. The method of claim 11, wherein the object detection is face detection.

17. A video coding method, comprising:
performing face detection on a video frame to be coded,
when a face is detected, sampling content of pixel blocks in an initial face polygon identified by the face detection to generate statistics of pixels in the sampled pixel blocks,
comparing the statistics of the sampled pixels to content of pixels outside the initial face polygon but adjacent to the initial face polygon based on a variable similarity threshold,
for pixel blocks that are adjacent to at least two pixel blocks of the initial face polygon, lowering the variable similarity threshold for the comparison to increase a probability of admission of the at least two pixel blocks into the initial face polygon,
growing the initial face polygon to a final face polygon to include (1) pixels in the initial face polygon, and (2) when the lowered variable similarity threshold is met, pixel blocks adjacent to the at least two pixel blocks
filtering content of pixel blocks for which the comparison determines are not part of a face,
increasing quantization parameters of the pixel blocks outside the final face polygon according to each pixel block's respective distance from the final face polygon,
defining a plurality of sub-regions of the frame around the final face polygon,
assigning the pixels outside the final face to a respective sub-region according the pixels' quantization parameters, and
coding the video frame according to a block-based compression algorithm that employs a quantization parameter, wherein the pixel blocks inside the final face polygon are coded with a quantization parameter having lower values for pixel blocks within the final face polygon and pixel blocks of each sub-region outside the final face polygon are coded according to generally higher quantization parameters within each sub-region.

18. The method of claim 17, wherein the sub-regions form halos of pixel blocks around the face polygon.

19. A coding apparatus, comprising:
a coding engine to code frames of a video sequence according to predictive coding techniques applied to pixel blocks of the frames,
an object detector to identify locations of objects within frames of the video sequence for an initial object region,
a controller to grow the initial object region to a final object region to include: (1) pixel blocks corresponding to the initial object region, and (2) when a condition of a lowered variable similarity threshold is met, pixel blocks adjacent to at least two pixel blocks of the initial object region that share common statistics as the pixel blocks in the initial object region based on a comparison of statistics of the pixel blocks in the initial object region and the adjacent pixel blocks using a variable similarity threshold, wherein the variable similarity threshold is lowered to increase a probability of admission of the at least two pixel blocks into the final object region, and
the controller to reduce a quality of coding parameters of the pixel blocks outside the final object region according to each pixel block's respective distance from the final object region, define coding regions within the frames, the coding regions including the final object region and a plurality of sub-regions formed based on the quality of coding parameters of each pixel block outside the final object region, the controller to adjust coding parameters applied by the coding engine providing relatively high quality coding for pixel blocks in the final object region and the pixel blocks in each sub-region are coded according to the quality of coding parameters of the pixel blocks within each sub-region.

20. The apparatus of claim 19, further comprising a blur filter applying pre-processing to the video sequence prior to coding by the coding engine, the blur filter to apply blurring to frame data corresponding to the sub-regions.

21. The apparatus of claim 20, wherein the blur filter applies increasing levels of blur for pixels at higher distances from the object region and lower levels of blur for pixels at lower distances from the object region.

22. The apparatus of claim 20, further comprising a motion estimator,
wherein the blur filter applies increasing levels of blur for pixels outside the object region for frames having higher levels of motion and lower levels of blur for pixels outside the object region for frames having lower levels of motion.

23. The apparatus of claim 19, wherein the object detector is a face detector.

24. The apparatus of claim 19, wherein the controller provides quantization parameter adjustments to the coding engine, including higher quantization parameter adjustments to pixel blocks of the sub-regions.

25. The apparatus of claim 19, wherein the controller provides coding mode selections to the coding engine, including SKIP mode assignments to select pixel blocks of the sub-regions.

26. A non-transitory computer readable medium storing program instructions that, when executed by a processor, cause the processor to:
  parse a frame to be coded into a plurality of pixel blocks,
  perform object detection on the plurality of pixel blocks,
  when an object is detected, define a final object region:
    define an initial object region representing an area of the frame in which the object is located and sample pixel blocks in the initial object region to develop statistics of the detected object,
    compare pixels not in the initial object region but adjacent to the initial object region to the object statistics of the detected object based on a variable similarity threshold,
    for pixel blocks adjacent to at least two pixel blocks of the initial object region, lower the variable similarity threshold for the comparison to increase a probability of admission of the at least two pixel blocks into the final object region,
    grow the final object region to include: (1) pixel blocks corresponding to the initial object region, and (2) when the lowered variable similarity threshold is met, the pixel blocks adjacent to the at least two pixel blocks of the initial object region identified by the comparison as having similar statistics as the detected object statistics,
    reduce a quality of coding parameters of the pixel blocks outside the final object region according to each pixel block's respective distance from the final object region,
    define a plurality of sub-regions of the frame outside the final object region,
    assign each pixel block outside the final object region to a respective sub-region according to that pixel block's quality of coding parameters, and
    code the frame according to a block-based compression algorithm wherein pixel blocks of the final object region are coded according to coding parameters generating relatively high quality coding and pixel blocks in each sub-region outside the final object region are coded according to the quality of coding parameters of the pixel blocks within each sub-region.

27. The medium of claim 26, wherein the coding parameters include quantization parameters and the quantization parameters of the object region pixel blocks are generally lower than the quantization parameters of the non-object region pixel blocks.

28. The medium of claim 26, wherein the coding parameters include coding mode selections and coding mode selections of non-object region pixel blocks are set to SKIP.

29. The medium of claim 26, wherein the instructions further cause the processor to, prior to coding, apply a blurring filter to pixels in spatial areas outside the final object region.

30. A non-transitory physical computer readable storage medium storing coded video data generated by an encoder that:
  parsed a frame to be coded into a plurality of pixel blocks,
  performed object detection on the frame,
  when an object is detected, defined a final object region by:
    having defined an initial object region representing an area of the frame in which the object is located and sampled the pixel blocks in the initial object region to develop statistics of the detected object,
    having compared statistics of pixel blocks not in the initial object region but adjacent to the initial object region to the object statistics of the detected object based on a variable similarity threshold,
    for pixel blocks adjacent to at least two pixel blocks of the initial object region, having lowered the variable similarity threshold for the comparison to increase a probability of admission of the at least two pixel blocks into the final object region,
    having grown the final object region to include: (1) the pixel blocks corresponding to the initial object region, and (2) when the lowered variable similarity threshold is met, the pixel blocks adjacent to the at least two pixel blocks of the initial object region identified by the comparison as having similar statistics to the detected object statistics,
    having reduced a quality of coding parameters of the pixel blocks outside the final object region according to each pixel block's respective distance from the final object region,
    having defined a plurality of sub-regions of the frame outside the object region,
    having assigned each pixel block outside the final object region to a respective sub-region according to that pixel block's quality of coding parameters, and
    having coded the frame according to a block-based compression algorithm wherein pixel blocks of the final object region were coded according to coding parameters generating relatively high quality coding and pixel blocks in the sub-regions outside the final object region were coded according to the quality of coding parameters of the pixel blocks within each sub-region.

* * * * *